United States Patent Office 3,318,716
Patented May 9, 1967

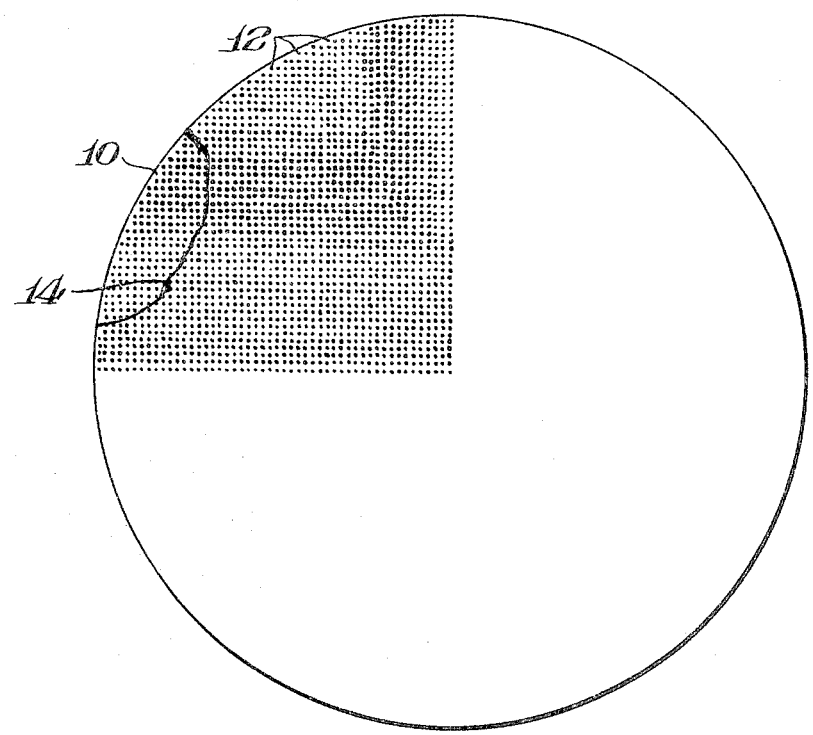

3,318,716
FOAM REDUCTION AND COATING
Ludwig K. Schuster, Dresher, and Alfonso L. Baldi, Jr., Drexel Hill, Pa., assignors to Pennsalt Chemicals Corporation, Philadelphia, Pa., a corporation of Pennsylvania
Filed Sept. 11, 1962, Ser. No. 222,864
22 Claims. (Cl. 106—287)

The present application is in part a continuation of applications Ser. No. 666,852 filed June 20, 1957 (now Patent 3,112,231 granted Nov. 6, 1963); Ser. No. 738,648 filed May 29, 1958 (now Patent 3,053,693 granted Sept. 11, 1962); Ser. No. 814,200 filed May 19, 1959 (now Patent 3,053,702 granted Sept. 11, 1962); Ser. No. 6,021 filed Feb. 1, 1960 (now Patent 3,128,546 granted Apr. 14, 1964); Ser. No. 88,018 filed Feb. 9, 1961 (now Patent 3,094,435 granted June 18, 1963); and Ser. No. 108,130 filed May 5, 1961, now abandoned. Application Serial No. 88,018 is in turn a continuation-in-part of application Ser. No. 708,772 filed Jan. 14, 1958, and subsequently abandoned.

The present invention relates to the reduction of foam, as for example in coating mixtures, as well as to coating techniques.

Among the objects of the present invention is the provision of novel compositions that are useful in reducing foam in aqueous dispersions, as well as novel methods for reducing such foam.

Additional objects of this invention include novel coating mixtures and coating methods that can make use of the above foam reduction, and novel products thereby produced.

The above as well as additional objects of the present invention will be more fully appreciated from the following description of several of its exemplifications, and from the annexed drawing.

It has been discovered that very effective foam reduction is obtained in aqueous dispersions by adding to the dispersions a composition that consists essentially of a leafing aluminum pigment, a liquid ethylene glycol, and a wetting agent having a long molecule, one portion of which is strongly hydrophilic and another portion strongly hydrophobic, there being from about ¼ to 1½ parts of said metal pigment by weight for every part of said ethylene glycol by weight, and the wetting agent concentration being from about 5% to about 25% by weight.

The ethylene glycol in the foregoing composition can be the simple ethylene glycol or any of its polymeric forms such as diethylene glycol, triethylene glycol, tetraethylene glycol, and so on up to polyethylene glycols having molecular weights as high as 9000. A hydrocarbon substituted ethylene glycol or polyethylene glycol such as propylene glycol and dipropylene glycols can also be used in the foregoing compositions.

The wetting agent can be any one of the aforementioned types and can be cationic, non-ionic or anionic, as described in the text, "Surface Active Agents and Detergents," by Schwartz, Perry and Berch, vol. 2, published by Interscience Publishers, Inc. The non-ionic wetting agents are less likely to exhibit undesirable side effects in connection with the present invention, and are preferred. Examples of non-ionic wetting agents include the alkylphenoxypolyethoxyethanols litsed in U.S. Patent 2,971,934 granted Feb. 14, 1961; mono-anhydro sorbitol stearate octa-ethoxy-ethanol; the reaction product of 160 parts (by weight) of ethylene oxide with 100 parts of tall oil described in U.S. Patent 2,586,767 granted Feb. 19, 1952; coconut oil fatty acid phosphate diester of dodeca-ethoxy ethanol as described in U.S. Patent 2,586,897 granted Feb. 26, 1952; the reaction product of monoethanol stearamide with 13 mols of ethylene oxide as described in U.S. Patent 2,520,381 granted Aug. 29, 1950; the mono-oleic acid ester of sucrose; dodecyl beta alanine; and block interpolymers of ethylene oxide and propylene oxide. Quaternary ammonium salts of lyophilic acids such as lauryl dimethyl benzyl ammonium chloride, are examples of cationic wetting agents, as are N-oleyl trimethylene diamine and 2-stearyl imidazoline. Hydrocarbyl sulfates and sulfonates, as well as amine soaps and triethanolamine stearate typify the anionic class.

A particularly desirable range of formulations for the above composition is by weight, from about 35 to about 45% leafing aluminum, about 45 to 55% of a polyethylene glycol ranging from tetraethylene glycol to nonaethylene glycol, and about 5 to about 10% of a non-ionic wetting agent of the above type.

It appears that a substantial proportion of the leafing pigment particles of the above compositions tends to spread over the surface of aqueous solutions to which they are added, rather than go into dispersion in the body of the solutions, and that this stratification is intimately associated with foam reduction. Regardless of the explanation, however, the addition of five grams of one of the above compositions to a gallon of the coating dispersion described in Example I of U.S. Patent 3,053,702 granted Sept. 11, 1962, will markedly diminish foaming of the dispersion when it is agitated and circulated through a roller-coating apparatus.

The foam reduction seems to vary with the surface-to-volume ratio of the body of liquid subjected to foaming conditions. Liquid bodies with low ratios have their foaming more effectively reduced than those with higher ratios. In general a desirable concentration of the defoamer is from 3 to 8 grams per gallon of liquid defoamed, with the higher concentrations preferred when the body of liquid defoamed has a ratio higher than 1:6 for square inches of surface to cubic inches of volume.

Similar results are obtained with other aqueous dispersions so long as they are not too alkaline. When they have a pH above about 9, their foaming tendencies are not very sharply reduced. Similarly, dispersions that are not compatible with aluminum, as for example because they contain free hydrochloric or sulfuric acid, will not give desirable results.

The above defoaming action is not obtained if the wetting agent is not present in the defoamer composition. The composition without wetting agent falls to the bottom of the dispersions to which it is added and does not produce the prompt pigment stratification described above. Similar problems arise when the defoamer composition is added as a solid, so that solid defoamers of the above kind should be melted and added in molten form to the dispersion to be defoamed.

The above defoamer composition can also be used to supply aluminum pigment to coating formulations. A greater concentration of the pigment-containing composition is used when such pigmentation is desired inasmuch as the minimum and usual defoaming concentrations provide so little pigment that it is not noticeable in the final coating. In general, the amount of pigment composition needed for appreciable pigmentation of a coating introduces a significant amount of the ethylene glycol into the coating, and it is generally desirable to remove some or all of this additive as by baking to volatilize it. This is a suitable technique where the coating is the conventional type of water-dispersed paint, for example, and only about fifteen minutes of baking at 400° F. will drive off triethylene glycol and lower boiling glycols so added. Thirty minutes or more at 450° F. may be used for the less volatile glycols.

Where the coatings are of the type that contain acidic hexavalent chromium, as in the above Patent No. 3,053,702, the foregoing ethylene glycols serve as reducing agents for the hexavalent chromium, and are in large part oxidized and converted to innocuous products at the above baking temperatures, and even down to 275° F., with baking times as short as one or two seconds. These coating formulations can accordingly take into account the reduction to trivalent chromium thereby effected, and decreases the remaining content of reducing agent to allow for it.

The following are examples of pigment and coating compositions pursuant to the present invention:

EXAMPLE I 2.1 grams aluminum powder of the leafing variety as described in U.S. Patent 2,312,088
2.5 grams hexaethylene glycol
0.4 gram para-n-octyl phenyl ether of decaethylene glycol The above ingredients are mixed together until they form a homogeneous paste-like mixture that can be used in small quantities for defoaming. Warming to about 50° C. makes it more fluid and improves the defoaming action, although it can also be used at room temperature with very good results.

EXAMPLE II 1295 ml. of an aqueous dispersion of a methacrylate resin as in Example 3 of U.S. Patent Application Serial No. 6,021 filed February 1, 1960, and having a resin solids content of 39%, a sucrose content of 7%, and a total wetting agent content of 0.7%.
235 ml. of an aqueous dispersion of $TiO_2$ pigment containing 36% $TiO_2$ and 3% hydroxyethyl cellulose
605 ml. of an aqueous solution of zinc dichromate in a concentration equivalent to 0.5 gram total $CrO_3$ per milliliter
1650 ml. water The above ingredients are mixed together to form a coating dispersion of the type disclosed in U.S. Patent 3,053,702. However, this dispersion has a tendency to form excessive foam upon agitation. The addition to this dispersion of five grams of the defoamer composition of Example I will immediately reduce the foaming tendency to the point that it can be agitated and circulated without difficulty and without having foam interfere with the coating application. The defoaming action persists for many hours. At the same time the appearance and protective characteristics of the coating are not significantly altered. The polyethylene glycol and extra wetting agent of the defoamer composition seem to be oxidized away or otherwise converted during the curing of the coating, as described in U.S. Patent 3,053,702, so that the final coating is substantially identical to the coating produced by the composition of Example II without the defoamer.

Increasing the proportion of defoamer addition from five grams to about 25-50 grams for the coating dispersion of Example II will not only substantially eliminate foam but impart a metallic appearance to the final coating. This appearance results essentially from a superficial coating stratum in which the aluminum pigment concentrates. As a result the metallic appearance substantially hides the normally greenish or brownish appearance such a coating would have by reason of its chromium content. The preparation of such coatings free of the greenish or brownish color has heretofore been a serious problem. Even a high concentration of $TiO_2$ pigment does not pale the color sufficiently, yet a relatively small concentration of aluminum pigment will effectively hide it.

The zinc dichromate of the coating mixture of Example II as well as in the other coating mixtures of Patent 3,053,-702 and related Patent 3,053,693 granted September 11, 1962, behaves as though all its chromium is in the form of free $CrO_3$ and nearly all of this chromium is reduced by the curing operation carried out as described in the above patents. The alternative dichromates of metals having a valence greater than one described in these patents, behave similarly. However some of these dichromates, such as those of aluminum and iron, yield coatings not quite as desirable as the dichromates of zinc, calcium, magnesium, cadmium and strontium.

Inasmuch as the above types of coatings are more resistant to chemicals when the chromium content is about 95% trivalent (the remainder being hexavalent), the addition of significant amounts of aluminum pigment concentrate can be compensated with respect to the reducing effects of its ethylene glycol or polyethylene glycol content as well as its wetting agent content, by diminishing the amount of reducing agent in the basic coating formulation if this is needed to reach the most resistant ratio of trivalent to hexavalent chromium.

The leafing nature of the aluminum pigment is associated with adsorbed surface layers of fatty acid and/or an aluminum salt of a fatty acid on the pigment particles. These surface layers are hydrophobic in nature and help keep the pigment particles from becoming uniformly dispersed in aqueous media. There is actually no need to have such uniform dispersion and fewer precautions are accordingly needed in the compounding the leafing pigment in such coating dispersions. The mere addition of the above defoamer mixtures without much stirring is sufficient to prepare the coating dispersion for the coating operation.

Because of the absence of the need for uniform dispersion, the aluminum-pigment-containing dispersion can be made with a wider range of formulations than heretofore considered necessary. For instance Patent No. 3,053,702 shows that in its pigment-containing coating formulations excessive acidity leads to instability of the coating dispersions. These higher instabilities can be tolerated when the only pigment used is the leafing aluminum pigment of the present invention. Accordingly the dispersion can have a higher concentration of free $CrO_3$ and can have less dichromate. Indeed, all the chromium can be in the form of free $CrO_3$ where the coating dispersion contains no resin or a resin that forms a stable dispersion under these conditions. Acrylic resins are particularly preferred and they are highly unstable unless the free $CrO_3$ content is substantially zero.

Without the wetting agent content the aluminum pigment defoamer composition causes some difficulty when used in concentrations high enough to impart a metallic appearance, that is about 10 grams of aluminum metal per gallon. An aqueous coating dispersion to which is added such a pigment concentrate free of wetting agent, produces a pocked or disfigured coating unless after the addition the dispersion is permitted to stand for at least about 24 hours. The pock formation seems to be associated with the aluminum pigment particles. When the aluminum pigment composition contains wetting agent in the above-mentioned proportions, a coating dispersion to which it is added even in very high concentrations (100 grams aluminum metal per gallon) will produce a coating free of pocks or other flaws without requiring any delay or waiting.

The surface appearance of the coatings produced in the foregoing manners is most metallic when the coating dispersion is applied by spraying. Roller coating and dipping form coatings in which the aluminum pigment tends to be more uniformly distributed throughout the thickness of the coating layer and less concentrated at the surface of the coating, so that the metallic surface appearance is more subdued. This is particularly emphasized when the roller coating or dipping is promptly followed by the curing step.

The following are examples of very effective spray and roller coating formulations.

EXAMPLE III

Spray 834 grams of the acrylate emulsion sold by Rohm and Haas of Philadelphia, Pa., as C-72 and having a 45% content of resin solids 785 grams of an aqueous solution of ZNCr₂O₇ having a density of 1.54
166 grams of the defoamer of Example I
2380 cc. water This formulation is readily sprayed with air pressure from 35 to 80 pounds per square inch, preferably 65. An external mix spray gun works very well for this purpose. It is also suitable for electrostatic spraying, although non-electrostatic spraying gives very good results.

EXAMPLE IV

*Roller coating*

594 grams of the defoamer of Example I
2772 cc. of the acrylate emulsion of Example III
1818 cc. of the zinc dichromate solution of Example III
4000 cc. water Other defoamer mixtures can also be used in any of the above connections. A typical alternate is:

EXAMPLE V 2.1 grams leafing aluminum flakes
3.0 grams ethylene glycol
0.3 gram amine 220 (a wetting agent corresponding to the formula 1-hydroxyethyl-2-oleyl-imidazoline)

The pigment defoamer concentrates of the present invention, such as that of Example I, are quite stable and will keep for many months. They do not contain any significant amount of free water and the aluminum particles in them retain their shiny metallic appearance. They can be used to defoam or pigment other aqueous coating dispersions such as the usual water-based paints including those described in U.S. Patents 3,011,988 (particularly its Ex. 1), 2,956,962 (particularly its Ex. 28), 2,871,213 (particularly its Ex. 2), 3,010,929 (particularly its Ex. V), 2,918,391 (particularly its Ex. IV), 3,023,177 (particularly its Ex. I), or even resin-free coatings such as described in U.S. Patents 2,768,103, 2,768,104 and 2,911,332.

The aluminum particles of the present invention need not be aluminum-colored, but can be colored as by dyes or by preparing the particles from aluminum alloys that contain copper or other metals in amounts that give the particles other colors. In addition, leafing pigment particles can also be formed from copper, brass and other metals, by methods used for preparing leafing aluminum, and they can be used in place of the leafing aluminum in the above combination, with suitable compensation for the higher specific gravity of these denser metals. Since the pigmenting is essentially a volume effect, a pigment having a higher specific gravity should be used in a correspondingly higher weight concentration to give the same pigment effects. However, the more dense metals are not as effective as aluminum in their defoaming action.

The above defoaming is more desirable than the use of silicone oil, stearic acid, or other prior art defoamers inasmuch as such prior art defoamers detract from the properties of the final coating. Flow-coating is also greatly benefitted by the defoaming of the present invention.

In the coatings that contain hexavalent chromium as in Patents 3,053,702, the glycols in the defoamer of the present invention act as reducing agents which these coating formulations require. This reducing action is obtained regardless of the molecular weight of the glycol. Non-ionic wetting agents also effect some reduction of the hexavalent chromium, and accordingly do not remain as such in the final coating to any appreciable degree. This is another advantage of non-ionic wetting agents, inasmuch as the presence of wetting agents in the final coating detracts from its effectiveness. On the other hand in coatings that do not contain hexavalent chromium, the glycols in the defoamers of the present invention are sufficiently volatile (they are liquid when used) to volatilize away in substantial amounts during a baking operation.

The addition of aluminum particles to a coating by means of the defoamers also facilitate welding to metal carrying such coating. About 10 to 20 grams of defoamer paste per gallon of coating mixture, or about 1 to 2% aluminum in the final coating is sufficient to enable spot welding through coatings as thick as 0.1 mil or thinner.

The coatings of the present invention are readily dried by flaming either before or during any final cure that may be needed. Such flaming is a very simple and rapid treatment, and for water-based paint layers that are free of hexavalent chrominum, provides a desirable technique suitable for very high speed production lines without endangering the quality of the coating.

The use of flames with ceramic type burners is even more desirable because the ceramic becomes incandescent and supplies a very rapid type of radiant heating that does not depend on convection or conduction of heat. Porous ceramic burners in which gas is fed through the pores and burned on the surface are especially preferred because they are extremely effective and have given cures in as little as one second exposure to the burners. Moreover, when shutting down a line such burners are rapidly cooled by merely shutting off the gas while continuing to blow air through them. This keeps the coated material from being overheated when the line is stopped with the material still exposed to the burners.

The coatings that contain the hexavalent chromium are more protective than the others, and are especially desirable for drawn steel containers such as are used for pressurized shaving lather dispensing or other so-called aerosol cans. A drawing operation used to make cans of this type leaves the steel more susceptible to corrosion, and chromium-free coatings are not adequate to fully protect them. Steel containers for water-based paints are also susceptible to rapid corrosion and are desirably protected by the hexavalent-chromium-containing coatings of the present invention. Resin need not be present in such coatings but its presence helps. A preliminary grain boundary etch of the steel is also helpful.

A very effective hexavalent-chromium-containing primer type paint for automotive use in accordance with the present invention is as follows:

EXAMPLE VI

| Pigment Dispersion: | Pounds per 100 gallons of final product |
|---|---|
| Water | 103.0 |
| Tamol 731 (25% in water) (Sodium salt of highly carboxylated polymer available from Rohm & Haas Co.) | 3.0 |
| Pure red iron oxide | 69.0 |
| China clay | 69.0 |
| Barium sulfate | 138.0 |
| Surfynol 102 (20% in ethanol) (a hydrocarbyl substituted butyne-2,diol-1,4 melting at 61° C. available from Air Reduction Chemical Co.) | 1.5 |

Let Down:

| | |
|---|---|
| Dow Latex 566 (46% non-volatile) a thermosetting butadiene-styrene polymer available from the Dow Chemical Co.) | 588.0 |
| Triton CF–10 (50% non-volatile) (alkyl aryl polyether alcohol available from Rohm & Haas Co.) | 5.5 |
| Water dispersion manganese (5% metal as manganese naphthenate dispersed in water) | 6.0 |
| Zinc dichromate | 38.0 |
| | 1021.0 | and for use on automobile bodies showed enhanced corrosion resistance and underfilm protection of subsequent layers of paint than a similar coating without the zinc dichromate. A primer with better sanding properties is obtained by increasing the pigments to twice the listed values.

Other dispersing and suspending agents can be used in place of Tamol, Surfynol and Triton, and other butadiene-styrene polymers such as that described in Example II of U.S. Patent 2,683,698 granted July 13, 1954, can be used in place of the Dow resin, with equivalent results. In all such coatings about 70% of the chromium is converted to trivalent condition by the wetting and dispersing agents. The ratio of $CrO_3$ (as dichromate) to resin is about 1:10, but this is enough $CrO_3$ to contribute significant advantages.

The addition of the defoamer concentrate of the present invention to the above primer makes it more convenient for use under agitation.

The hexavalent-chromium-containing coatings of the present invention with or without the aluminum pigment, are very effectively applied over ferrous or other metals that have been given a prior adherent coating of oxide or other materials such as phosphate, oxalate, sulfide or other chromate coatings, including those used to improve the adhesion of paint as well as to lubricate those metals for working operations. Blackened zinc can also be effectively protected by the hexavalent chromium-containing coatings. Examples of such preliminary treatments are given in the above-identified U.S. Patent 2,768,104.

Coatings of the present invention when so applied over the pre-coated metals give much better protection against corrosion as compared to pre-coated metals when they are not given a second coating. It is also noted that a waterbase paint when applied over such double coated metals, also gives much better corrosion resistance, and for this purpose the coating of the present invention need not have any resin or pigment present and can even be applied in very thin films. Thus, a 20 milligram per square foot coating from an aqueous solution of only zinc dichromate and a compatible reducing agent like sucrose, so as to cause 70 to 95% reduction of the hexavalent chromium to trivalent form when this solution is subjected to the curing step, makes a very desirable covering over plain carbon steel that has been phosphatized, as shown in Examples 13 and 14 of the above Patent 2,768,104. The zinc-dichromate-reducing-agent solution can be merely applied in the form of a final rinse after the phosphatizing operation, particularly when the material being treated is a formed object such as an automobile frame or chassis. A similar improvement is obtained with such formed objects that are first given a grain boundary etch, and after curing, given a final coat of water-based paint. Similar results are also obtained with such formed objects when $CrO_3$ is used in place of zinc dichromate in each of the above modifications.

Iron phosphate is a particularly inexpensive phosphate applied by a phosphatizing treatment to prepare plain carbon steel for the hexavalent-chromium-containing coatings of the present invention.

The above hexavalent-chromium-containing coatings can also be used with or without the above defoaming to avoid giving coated objects, such as bright stainless steel and aluminum, the appearance of having a coating. For this purpose polytetrafluoroethylene is used as a resin in a coating formulation that leaves a coating weight of 1.5 milligrams per square foot. For such treatment there can be used:

EXAMPLE VII 6 grams zinc dichromate
2 grams sucrose
4 cc. of an aqueous dispersion of polytetrafluoroethylene having 50% resin solids content by weight
0.05 gram p-octyl phenyl tri-oxyethylene ethanol diluted to 4 liters with water.

A dip in the above formulation followed by heating of the dipped product at 400° F. to cure the coating left by the dip, provides a 3 milligram per square foot protective layer that imparts very good corrosion resistance to stainless steel articles such as automobile windshield wiper arms. Most of the cured coating is in powdery form and will readily rub off on handling, without detracting from the corrosion resistance but improving the appearance by rendering the protective coating invisible. In the above formulation the resin-to-$CrO_3$ ratio can be varied from 3:1 to 1:3, and in fact the resin can be entirely omitted although this diminishes the corrosion protection somewhat. The zinc dichromate of the above formulation can be replaced by strontium dichromate, or calcium dichromate or even $CrO_3$ with not much loss of effectiveness. The curing can take place at any temperature between 250° and 450° F.

Television picture tube masks and screens made of plain carbon steel are greatly improved by the hexavalent-chromium-containing coatings of the present invention, particularly such coatings that contain no resin. Tube components so coated can be sealed in place without difficulty and have a very long life. Color television picture tube masks that provide three-color separation for individual surface elements of the tube screen can be made by etching or otherwise forming fine apertures in a sheet of metal such as iron or copper, and the completed mask can be coated with a dilute aqueous solution of 2% chromic acid and ⅔% reducing agent such as triethanolamine, after which the mask can be drained to free it from excess solution and then heated to 250° F. to cure the coating. Substitution of zinc dichromate for all or part of the chromic acid is to be avoided in such uses inasmuch as such substitution makes it more difficult to adequately outgas the tube. The chromic acid type coatings, even though they appear to be hydrated, do not complicate the outgassing treatment which the inside of the tubes must undergo. A little manganese compound dissolved in the coating solution in accordance with the teachings of U.S. Patent 2,777,785 granted Jan. 15, 1957, helps prolong its useful life. Still longer solution life is obtained by using in place of the triethanolamine in the last formulation a polyethylene glycol having a chain of from 4 to about 400 glycol units. Such a glycol, as for example one with a molecular weight of 3000 when combined with the 0.1% potassium permanganate, makes a very effective coating that can be baked at 460° C. for 5½ hours to give a particularly desirable picture mask that can be sealed in place without difficulty even when made of plain carbon steel. Such a long heat treatment reduces problems in the tube sealing. Other parts of electron or so-called "vacuum" tubes can also be provided in a similar manner. The coatings thus applied are mixed chromium oxides containing 20 to 60% chromium by weight, about 70 to 95% of the chromium being trivalent, the remainder being hexavalent, and the coatings weighing about 5 to 100 milligrams per square foot of surface covered.

The figure of the drawing shows such a mask 10 having color separation opening 12 and a coating 14 as described above. The coating is partially broken away to more clearly indicate its presence.

To illustrate the long life of the above polyethylene glycol coating baths, a polyethylene glycol having a molecular weight of about 9000 can be dissolved with about six times its weight of zinc dichromate in water to form a solution having 3% of equivalent $CrO_3$ content, and this solution even after a continuous boiling for eight hours will show no sign of any precipitation. Upon curing at 280 to 500° F., however, films of these polyethylene glycols will reduce the hexavalent chromium of the coating in a matter of only one to three seconds.

Polyglycols having as many as 400 glycol units can be used and will even show greater stability under boiling conditions without materially prolonging the curing time. On the other hand, the stability begins to taper off substantially as the number of glycol units is reduced below 40. A polyethylene glycol having a molecular weight of 300 will for example become useless after boiling for only about one hour in an aqueous solution that also contains zinc dichromate. Smaller molecular weights show even greater instability.

Dry mixtures of zinc dichromate and these polyglycols are more stable than their aqueous solutions. Inasmuch as temperatures of about 120° F. are about the maximum normally encountered in commercial shipping and storage operations, the particularly desirable mixtures have polyglycols that melt at temperatures above 120° F. In the case of polyethylene glycol, this calls for a molecular weight of at least about 3000.

In addition of polyethylene glycol, polypropylene glycol and polytrimethylene glycol show the same high stability as well as effective reducing power upon curing. Compounds that include the polyethylene glycol structure, such as the alkaryl polyethoxy ethanol type wetting agents, also behave similarly.

At temperatures of about 150° F. and higher, zinc dichromate shows a strong tendency to hydrolyze in aqueous solution and deposit some insoluble normal zinc chromate. To avoid filtering off such a deposit there can be added to the hot bath just enough chromic acid to prevent the hydrolysis. About 5% of free chromic acid, based on the total weight of the zinc dichromate, is generally adequate for this purpose and the resulting mixture shows the remarkable stability described above notwithstanding the presence of this free acid.

Although the polyglycols having less than 40 glycol units per molecule are not too satisfactory for very high temperature coating baths, they do help materially in extending the useful life of cooler coating baths such as those used at room temperature. A polyethylene glycol having a molecular weight of only about 200 (tetraethyleneglycol) will by way of example show in a 10% aqueous solution of zinc dichromate at room temperature, a useful life of as much as a month or more, and such a life cannot be obtained with reducing agents like sugar. This increase in low temperature stability is of particular value when the coating formulation also contains other ingredients suspended or dispersed therein. Thus resin-containing coating formulations as described in U.S. Patents 3,053,693 and 3,053,702, such as one in which a polymethyl-methacrylate dispersion is mixed with an aqueous solution of zinc dichromate to form a coating composition having 5% resin and 6.5% of the dichromate, will remain free of flocculation or precipitation for a much longer period of time when these polyglycols are used as the sole reducing agent. All the other resin and pigment-containing formulations of those patents are similarly rendered more stable. For such resin-containing formulations it is preferred to have a polyglycol compound with not over about ten glycol units per molecule. Polyglycols with a greater number of glycol units tends to render the final cured coating somewhat cloudy and inferior.

This aspect of the invention is illustrated by:

EXAMPLE VIII 548 grams of 1:1 methyl methacrylate-ethyl acrylate copolymer in the form of an aqueous emulsion containing 40% polymer solids
7.6 grams of p-octyl phenoxy dodecaethoxy-ethanol
99.6 grams heptaethylene glycol
128 grams TiO$_2$
41 grams phthalocyanin blue
11 grams Cellosolve (hydroxyethyl cellulose) to help disperse the pigments
418 grams zinc dichromate
Water to make 1 gallon This formulation produces a very bright blue coating when applied with a roller and cured. The color is brighter than is obtainable with sucrose substituted for the heptaethylene glycol.

Another feature of the above polyglycol combination is that they are more effective than sugar in securing the desired conversion of hexavalent chromium to trivalent condition. Whereas it is generally preferred to use sugar in an amount one-third that of the CrO$_3$ present in the zinc dichromate in order to obtain a conversion of about 90 to 95%, the polyglycols effect the same degree of conversion when used in a proportion of about 25% by weight of the equivalent CrO$_3$ content. In other words, only about three-fourths as much polyglycol is needed as sugar. However for curing operations carried out in five seconds or less it is preferable to have the polyglycol used in the same amount as sugar would be used. Smaller degrees of conversion likewise take smaller amounts of the polyglycols.

The above stability effects of polyglycols for hot zinc dichromate solutions are obtained to a lesser degree with hot chromic acid solutions.

Water-soluble dichromates of other metals that have a valence greater than one will show the same more stable properties described above for zinc dichromate. Desirable examples of such other metals are magnesium, calcium, barium, strontium, aluminum, and nickel.

An exceptionally effective coating according to the present invention uses a thin undercoat of electrodeposited zinc. A typical technique of this type is:

EXAMPLE IX

SAE 1020 steel sheet is cleaned in a 2% aqueous NaOH dip at 180° F., rinsed with cold tap water and then electrolyzed as a cathode in the following bath:

60 grams per liter of Zn(CN)$_2$;
23 grams per liter of NaCH; and
53 grams per liter of NaOH The current density is adjusted to 11 amperes per square foot of cathode, the bath temperature to 45° C., and the electrolyzing continued until a 150 milligram per square foot layer of zinc is deposited. The zinc-covered metal is again rinsed with tap water, and sprayed with the following aqueous formulation:

45% zinc dichromate
8.1% sucrose
27.2% thermosetting butadiene-styrene resin solids
9.4% polyvinyl stearate
9.5% TiO$_2$
0.8% p-octyl phenyl tri-ethoxyethanol The sprayed metal is cured at 375° F. to leave a coating weighing 200 milligrams per square foot. The resulting coated product withstands corrosion better than aluminum-painted steel.

The zinc undercoating increases the adhesion and corrosion resistance of the resin-containing coating, which coating can be pigmented with the aluminum defoamer if desired.

While the hexavalent-chromium-containing coatings are very effective when applied over other types of preliminary coats, they are also very desirable for use as preliminary coats themselves. Thus a zinc dichromate-polyethylene-glycol formulation not containing resin gives on steel and magnesium a cured layer weighing 10 to 20 milligrams per square foot which provides unusually good corrosion resistance and adhesion when covered with an alkyd paint layer. An oil-modified alkyd paint is preferred in this combination, and the protection thus obtained is better than the combination of a zinc phosphate phosphatizing layer with a primer paint and then a top paint coat applied over it.

Another highly desirable combination with the zinc dichromate-polyethylene glycol pretreatment skips the curing of the layer so formed, this layer being merely dried at a relatively low temperature and then covered with a top layer of the hexavalent chromium type that contains a resin, such as that produced by the formulation of Example II. Such a top coating 0.3 to 0.4 mil thick after curing, works very well. The final curing also cures the pretreatment layer.

For steel surfaces that are exposed to the weather, as in transformer housings, the resin-free type of thin hexavalent-chromium-containing coating also does an admirable job in place of wash primers where used in combination with a flow coated epoxy prime coat and then an epoxy top coat of paint. The hexavalent-chromium-containing coating is best cured before the epoxy paint layers are applied.

Even resin-carrying layers of the hexavalent-chromium-containing coatings make good primers, particularly on steel and where the curing is deferred until after a top paint layer is applied over them. Here again a coating weight of 10 to 20 milligrams per square foot is preferred for the primer. The proportion of resin to effective $CrO_3$ in such primer can vary from 1:5 to 5:1 by weight with about 2:1 preferred, and any of the non-waxy resins taught in Patent 3,053,693 and Patent 3,053,702 can be so used.

Another feature of the coatings of the present invention is that they can be used to reduce the corrosion of plain carbon steel razor blades of the type used in shaving, for example. In this connection coatings which may or may not have resin are preferably applied in relatively thin layers directly over the cutting edge of the razor. A coating weight of only about 30 milligrams per square foot is adequate for this purpose, and such coatings are helpful in reducing somewhat the initial keenness of the edge. As a result, the tendency for a shaver to cut his face with a brand new blade is greatly diminished. However, the corrosion protection preserves the cutting edge between shaves so that it can be used for at least as many shaves as unprotected edges.

By reason of the short curing time required by the coatings of the present invention, it can be carried out while the articles being treated are moving on a production line at a speed of 100 to 700 feet per minute. When continuous sheets are so treated at high speed, it is preferable to quench them before coiling, as by contacting them with water-cooled rolls or flooding them with water. Quenching by direct contact with water improves the properties of the coatings somewhat.

The defoaming action of the present invention does not seem to depend on the nature of the foam-producing materials. Emulsions of all kinds of coating resins in water are susceptible to foam production and the defoamer compositions described above are very effective in sharply reducing this susceptibility. The coating resins can be the usual thermoplastic acrylates such as mixtures of methyl methacrylate and ethyl acrylate, as described in U.S. Patent 3,053,702, or they can be butadiene-styrene copolymers particularly of the thermosetting kind, or any other coating resin including thermosetting acrylics. Typical resins of this type are described in the June 1961 issue of Industrial and Engineering Chemistry, pages 458–468, and they can be emulsified in water either as toluene or xylene solutions, or as polymers that have been freed of all organic solvents or that were emulsion polymerized initially. These thermosetting acrylic resins are polymers that contain the acrylamide or acrylic acid or hydroxy alkyl acrylate structure and are cross-linked by baking at 300° F. or thereabouts in admixture with cross-linking agents such as formaldehyde, di- or polyepoxy compounds, or amino resins.

When the above thermosetting acrylic resins are used in admixture with $CrO_3$ or a water-soluble dichromate of a metal such as zinc that has a valence greater than one, the resin cure is shortened from the usual thirty minute period to less than five seconds. Whether or not the above defoamer is used in such compositions, the cure shortening takes place with proportions of $CrO_3$ (either free or as combined in the above dichromates) to resin from 5:1 to 1:5. Very effective formulations for this purpose correspond to that of Example VIII but with the resin of that example replaced by an equal amount of the thermosetting acrylic sold by Rohm and Haas as HA–16, or by any of the other thermosetting acrylics referred to above.

The final coatings so produced have about 95% of the chromium in trivalent condition. As little as 40% of the total chromium content can be so reduced to give very desirable properties. Where pigments are used in the coating, the conversion of the chromium should be at least 70% in order to keep from masking the pigment by the brown color of hexavalent chromium, unless the flaking aluminum is used and is concentrated on the surface of the coating.

Even in the absence of reducing agent, the cure shortening described above takes place, although the coating so produced is not as desirable as those produced within the above ranges of chromium conversion. Curing temperatures with or without the reducing agent, and with or without the chromium compounds, can range from 275° to about 550° F. without deleteriously affecting the coating, providing the curing time in the 450 to 550° F. range is kept down to not more than about two seconds.

The coatings of the present invention are extremely effective for protecting readily corrodible metals such as plain carbon steel. Articles such as steel wool can also be protected against premature corrosion by the chromium-containing coatings that are free of resin or that contain resin, but the curing of such coatings on steel wool should be carried out carefully at a relatively low temperature or in an inert atmosphere to keep the steel wool from igniting.

The resin-free or resin-containing coatings of the present invention are also highly suited to protect other metals. Aluminum bases for incandescent lamps are effectively protected by the resin-free coatings that weigh about 10 milligrams or less per square foot. The use of such thin coatings permits leads to be soldered directly to the coated metal, using aluminum solder, without having to remove the coating from the solder site. Such lamp bases can be unanodized or anodized, and the coatings stand up under the high temperatures the bases are subjected to during use.

Black coatings of the above type radiate heat in a very effective manner. Such coatings made with a mixture of carbon black and phthalocyanine blue to provide the black color, give closely reproducible radiation characteristics and are particularly desirable for this reason. $TiO_2$ can also be added in an amount up to about 50% of the carbon black to further improve the results. Coatings containing appreciable amounts of $TiO_2$ have very good resistance to the transfer of heat and this resistance is further improved by a superficial stratum of aluminum, as in Example II. The thermoplastic resins such as thermoplastic acrylates, become thermosetting during the curing step by reason of the action of the hexavalent chromium, and can be used to good advantage to make the above black or $TiO_2$-containing coatings.

Because of this and their chemical inertness, the mixed chromium oxide coatings of the present invention are also suitable for applications to rockets, satellites and the like, as well as to highway signs, such as those made of aluminum.

The pigment-containing mixed chromium oxide coatings of the present invention, with or without the resin, also make very durable coloring surface layers for asbestos panels, tiles and shingles such as those used as walls and siding in building construction. The unusually high alkaline resistance of these coatings gives them an unusually long life on these materials which are usually made from asbestos and Portland cement. Such panels can be painted with these coatings to give them a permanent surface layer that, if desired, can change their color. Such coatings can be applied during manufacture, or after the walls or siding have been in use. The curing of the coating to convert 40 to 95% of the chromium to the trivalent condition is readily accomplished on finished walls and siding by a blowtorch, inasmuch as the panels keep the inner portions of the wall from being affected by the short heat treatment that is required. The conversion changes the appearance of the coating so that it is readily followed by the eye, and unintentional repeated heating of any area is thus avoided.

The following example illustrates a particularly desirable process for coating a chain link type fence.

EXAMPLE X

The following coating formulation is prepared:

7560 cc. of an aqueous dispersion of a 2:1 methyl methacrylate-ethyl acrylate copolymer resin having by weight 41% resin solids, 1.3% sugar (sucrose) and 1.3% p-octylphenoxy dodecaethoxyethanol 1260 cc. of an aqueous $TiO_2$ dispersion containing by weight 36% $TiO_2$, 3% hydroxyethyl cellulose and 2.1% p-octylphenoxy dodecaethoxy-ethanol 1314 cc. of an aqueous dispersion of phthalocy-anin green containing by weight 48% pigment and 0.1% p-octyl phenoxy dodecaethoxy-ethanol 3168 cc. of a 45% by weight aqueous solution of $ZnCr_2O_7$ 9180 cc. water 60 cc. of a 20% aqueous solution of p-octyl phenoxy dodecaethoxy-ethanol This mixture is fed to an external mix spray gun under a pressure of 10 pounds per square inch, and mixed with an air jet supplied at a pressure of 20 pounds per square inch. The resulting spray is projected downwardly against a chain link fence fabric of 13 gauge steel that had been galvanized by hot dipping. The fence fabric is held in a horizontal plane 12 inches from the spray gun, and around the fabric there is provided an electrostatic charging electrode in the form of a rectangular tube of coarsely woven fine wire mesh. The walls of the mesh are to be located 6 inches from the fence fabric, and are charged to a negative D.C. potential of 100,000 volts with respect to the fence fabric. The upper wall of the mesh tube is between the fence fabric and the spray gun, and charges the spray droplets so that a single spray gun oscillated to and fro above the top of the mesh tube will effectively coat the entire surface of the fence fabric, both top and bottom as well as the portions that are partially obstructed by the linkage between fabric loops. Fabrics as wide as 42 inches can be so coated, after which they can be cured by a 75 second pass through an air oven held at 500° F., the fabric reaching a temperature of 450° F., following which a quench with cold water leaves the coated fabric in condition for immediate coiling.

The above coating has a brilliant green color, and makes the fence fabric especially resistant to corrosion. Other pigments can be used to impart other colors, however, or all pigments can be eliminated and still yield a very attractive product. Similarly other resins can be used or the resin completely eliminated.

Zinc surfaces such as on the above fence fabric seem to be chemically attacked slowly by hot aqueous solution containing chromic acid and polyethylene glycols that are relatively resistant to chromic acid, that is have molecular weights of at least about 3000. At temperatures above 160° F. the contacting of such solution in which the chromic acid content is at least about 1%, for about 2 to 10 seconds with zinc surfaces give a more corrosion resistant coated cured product than one formed the same way but with a 140° F. contacting temperature.

The above zinc coating solution can also be dissolved in it the dichromate of a metal with a valence greater than one. A typical solution of this type is formulated to have 0.11% $CrO_3$, an amount of $ZnCr_2O_7$ sufficient to bring the effective $CrO_3$ concentration to 1.20%, .26% polyethylene glycol of 9000 molecular weight, and 0.05% p-octyl phenoxy tetracontaethoxy ethanol. A five second dip of galvanized iron plate in this solution at 180° F., followed by curing at 425° F. for two seconds, gives a very durable product.

The wetting agents used in hot coating baths according to the present invention are preferably of the type that have very long polyethoxy chains, as in the p-octyl phenoxy tetracontaethoxy ethanol of the foregoing example. A chain of at least about 30 ethoxy groups along with the phenoxy attachment, provides sufficient resistance to the hexavalent chromium to keep such a wetting agent from premature destruction. This is particularly helpful in coating formulations that have dispersed resin and/or pigment that tend to flocculate out unless dispersing agents are present in significant concentration.

The use of hot coating formulations is desirable particularly in dip type coating technique because they deposit hot coating fibers which tend to dry promptly upon removal of the coated substrate from the coating station. This reduces somewhat the amount of concentrated heat needed for the coating, and also leaves the dried uncured coating less vulnerable to disturbances that would mar a liquid film.

The coatings of mixed chromium oxides including hexavalent chromium, when containing not more than three parts resin for every one part of free or combined $CrO_3$, can be abraded to give different surface effects without becoming gummy. With or without the resin they make very effective corrosion protection for steel typewriter and adding machine parts, magnesium surfaces of tape recorder reels, zinc base die castings such as pressure cooker weights that are exposed to high temperatures, and other such severely treated materials. Such coatings also withstand cold working of the metal to which they are applied, particularly if the metal has a zinc surface. Steel wire so coated can be drawn to a smaller size. For heavier coatings on very thin wires, e.g. those ½-mil thick, it is better to include in the coating at least about 20% $TiO_2$ by weight inasmuch as the coating dispersion otherwise tends to run off and leave relatively thin layers.

The resins that can be used in the mixed chromium oxide coatings of the present invention include polyvinyl chloride as well as others that make good coatings by themselves. Polyethylene and polypropylene are not as desirable because during curing they tend to pull away from edges. Any of the effective resin-containing coatings when applied in thin layers, that is about 20 milligrams or less per square foot, significantly increase the adhesion of subsequently applied nitrocellulose lacquers or chlorinated rubber layers. Waxy resins such as polyethylene and polypropylene, when incorporated in the mixed chromium oxide coating, do not have this adhesion-increasing effect. The use of air-drying enamels over a coating of the mixed chromium oxides also gives better results when the mixed chromium oxide layer contains a resin that is the same as or compatible with that in the enamel.

The mixed chromium oxide coatings of the present invention can also be applied from coating dispersions that are thickened as by the addition of 1–5% silica gel, or by adding other pigments in gel form. Hydroxyethyl cellulose, carboxymethyl cellulose and other thickeners are also suitable. The coating formulation of Example X has 0.23% hydroxyethyl cellulose, but for heavier coatings its concentration can be increased to 0.43% to keep such heavier coatings from draining or running. Higher concentrations cause the final product to have a dull appearance.

The coatings of the present invention are readily applied by spraying, and masks used to prevent overspray are readily washed off with water so that they can be reused. The spray can be applied wet, or by having excess air used to project the coating dispersion, much of the water in the dispersion can be volatilized off during the spraying and the coating then deposited in relatively dry form. Better adhesion to bright metal surfaces such as polished stainless steel or aluminum, is obtainable with a spray that deposits a wet coating, but greater coating weights are deposited by a dry type spray coating. A dry type spray used after a wet spray coating gives heavy coating weights with the greatest adhesion.

The resin-containing mixed chromium oxide coatings can also be used to insulate the laminations of transformer cores or the like, since they can be deposited in very thin films having good electrical resistance as well as high temperature life. From about ½ to 3 parts resin by weight should be used for every part of free or combined $CrO_3$ in such a coating, and thermoplastic acrylate resins are preferred for this purpose.

Waxy resins such as the above-mentioned polyethylene and polypropylene as well as polyetertafluoroethylene can be used in the mixed chromium oxide coatings of the present invention to make a self-lubricating surface. Polytetrafluoroethylene is especially desirable for such use, and can be used in a proportion of about ½ to 2 parts for every part of free or combined $CrO_3$ in the coating dispersion.

For corrosion resistant purposes the coatings of the present invention are preferably applied in a weight of from 75 to 200 milligrams per square foot where the coatings contain both resin and mixed chromium oxides. In this range such coatings seem to give the greatest amount of protection per dollar spent for the coating formulation.

Obviously many modifications and variations of the present invention are possible in the light of the above teachings. It is, therefore, to be understood that within the scope of the appended claims the invention may be practiced otherwise than as specifically described.

What is claimed:

1. A composition consisting essentially of a leafing aluminum pigment, a liquid ethylene glycol, and a wetting agent having a long molecule one portion of which is strongly hydrophilic and another portion strongly hydrophobic, there being from about ¼ to 1½ parts of said metal pigment by weight for every part of said ethylene glycol by weight, and the wetting agent concentration being from about 5% to about 25% by weight of the composition.

2. A pigment concentrate having by weight from about 35% to 45% leafing aluminum pigment, about 45% to 55% of a polyethylene glycol ranging from tetraethylene glycol to nonaethylene glycol, and about 5% to about 10% of a non-ionic wetting agent having a long molecule, one portion of which is strongly hydrophilic and another portion of which is strongly hydrophobic.

3. The method of reducing foam in aqueous dispersions of resins, which method comprises adding to such a dispersion that has a pH no higher than about 9 and is compatible with aluminum, the composition of claim 1 in liquid form.

4. The method of reducing foam in aqueous dispersions of resins, which method comprises adding to such a dispersion that has a pH no higher than about 9 and is compatible with aluminum, the composition of claim 2 in liquid form.

5. The method of applying a coating from an aqueous coating mixture, which method includes the steps of providing a water-based coating mixture containing a dispersion of a resinous coating vehicle, pigmenting the coating mixture by adding to it the composition of claim 1, and then applying the resulting pigmented coating mixture to the article to be coated.

6. The method of applying a coating from an aqueous coating mixture, which method includes the steps of providing a water-based coating mixture containing a dispersion of a resinous coating vehicle, pigmenting the coating mixture by adding to it the composition of claim 2, and then applying the resulting pigmented coating mixture to the article to be coated.

7. The method of claim 5 in which the coated article is subjected to a curing treatment that removes at least a portion of the ethylene glycol from the coating.

8. The method of claim 6 in which the coated article is subjected to a curing treatment that removes at least a portion of the polyethylene glycol from the coating.

9. The method of claim 7 in which the curing treatment is a baking treatment that partially volatilizes the ethylene glycol.

10. The method of claim 7 in which the curing treatment is a heating to a temperature of at least about 250° F., and the coating mixture is acidic and contains hexavalent chromium that oxidizes the ethylene glycol to more readily volatilizable materials.

11. The method of claim 8 in which the curing treatment is a baking treatment that partially volatilizes the polyetheylene glycol.

12. The method of claim 8 in which the curing treatment is a heating to a temperature of at least about 250° F., and the coating mixture is acidic and contains hexavalent chromium that oxidizes the polyethylene glycol to more readily volatilizable materials.

13. A coating composition in the form of an aqueous dispersion of a water-soluble dichromate of a metal having a valence greater than one, a compatible reducing agent for the hexavalent chromium in the dichromate, pigment including leafing aluminum, and a wetting agent having a long molecule one portion of which is strongly hydrophilic and another portion strongly hydrophobic, the reducing agent being present in a proportion such that it reduces from 40% to 95% of the hexavalent chromium to trivalent condition when the coating composition is dried and heated to at least 250° F., at least about ⅕ of the reducing agent being an ethylene glycol, and the wetting agent and the leafing aluminum being present in proportions that disperse the aluminum but substantially confine it to the superficial stratum of a dried layer of the dispersion.

14. The composition of claim 13 in which the aqueous dispersion also contains a hydrophobic resin.

15. The method of applying a coating from an aqueous coating mixture, which method includes the step of dipping the material to be coated in a body of the composition of claim 13, withdrawing the dipped material from said body, draining the excess coating mixture from the withdrawn material, and curing the drained product.

16. A coating mixture consisting essentially of zinc dichromate and a polyethylene glycol having a molecular weight about 9000, the polyethylene glycol being present in an amount about 22% by weight of the $CrO_3$ content of the dichromate.

17. A mixture of $CrO_3$ and a polyethylene glycol having a molecular weight of about 9000, the polyethylene glycol being present in an amount of about 22% based on the weight of the $CrO_3$ present.

18. A mixture of (I) a polyethylene glycol having a molecular weight of about 9,000 and (II) a hexavalent chromium compound selected from the class $CrO_3$ and water-soluble dichromates of metals having a valence greater than one, the polyethylene glycol content being sufficient to cause about 40% to about 95% of the hexavalent chromium to be reduced to trivalent condition when the mixture is heated to at least about 280° F.

19. An aqueous coating composition having the mixture of claim 16 dissolved in water.

20. An aqueous coating composition having the mixture of claim 17 dissolved in water.

21. A room temperature water solution of a mixture of (I) a water-soluble dichromate of a metal having a valence greater than one, and (II) a polyethylene glycol having a molecular weight of at least about 200.

22. The composition of claim 21 in which the dichromate is zinc dichromate.

References Cited by the Examiner

UNITED STATES PATENTS

| | | | |
|---|---|---|---|
| 2,662,031 | 12/1953 | Vogel et al. | 106—287 |
| 2,695,892 | 11/1954 | Jaccard et al. | 252—358 |
| 2,753,309 | 6/1956 | Figdor | 252—321 |
| 2,768,104 | 10/1956 | Schuster et al. | 148—6.2 |
| 2,773,623 | 12/1956 | Schuster et al. | 148—6.2 |
| 2,876,127 | 3/1959 | Ware | 106—287 |
| 2,949,557 | 8/1960 | Gerlach et al. | 313—346 |
| 3,025,252 | 3/1962 | Jack | 106—290 |
| 3,076,768 | 2/1963 | Boylan | 252—358 |
| 3,113,236 | 12/1963 | Lemmens et al. | 313—346 |

MORRIS LIEBMAN, *Primary Examiner.*

A. LIEBERMAN, *Assistant Examiner.*